US012297051B2

(12) United States Patent
Vorhees

(10) Patent No.: US 12,297,051 B2
(45) Date of Patent: May 13, 2025

(54) CONVEYOR SAFETY SHIELD FOR POINT-OF-SALE SYSTEM

(71) Applicant: TOSHIBA GLOBAL COMMERCE SOLUTIONS, INC., Durham, NC (US)

(72) Inventor: Kevin Hunter Vorhees, Raleigh, NC (US)

(73) Assignee: Toshiba Global Commerce Solutions, Inc., Durham, NC (US)

( * ) Notice: Subject to any disclaimer, the term of this patent is extended or adjusted under 35 U.S.C. 154(b) by 136 days.

(21) Appl. No.: 18/161,488

(22) Filed: Jan. 30, 2023

(65) Prior Publication Data
US 2024/0253911 A1 Aug. 1, 2024

(51) Int. Cl.
B65G 47/29 (2006.01)
A47F 9/02 (2006.01)
A47F 9/04 (2006.01)
B65G 15/32 (2006.01)

(52) U.S. Cl.
CPC ............... *B65G 47/29* (2013.01); *A47F 9/02* (2013.01); *B65G 15/32* (2013.01); *A47F 2009/041* (2013.01)

(58) Field of Classification Search
None
See application file for complete search history.

(56) References Cited

U.S. PATENT DOCUMENTS

| 2,493,464 | A | * | 1/1950 | Nelson | B65B 57/20 198/525 |
| 2,569,711 | A | * | 10/1951 | Foster | A47F 9/04 53/391 |
| 2,723,728 | A | * | 11/1955 | Crawford | A47F 9/04 198/572 |
| 2,884,094 | A | * | 4/1959 | Roy | A47F 9/04 312/140.1 |
| 5,515,944 | A | * | 5/1996 | Cappi | A47F 9/047 186/61 |
| 5,706,912 | A | * | 1/1998 | Holland | A47F 9/04 186/68 |
| 8,783,438 | B2 | * | 7/2014 | Phan | A47F 9/04 198/367 |
| 9,745,145 | B2 | * | 8/2017 | Schaefer | A47F 9/04 |
| 10,106,327 | B2 | * | 10/2018 | Bacallao | G06F 3/0317 |
| 11,548,738 | B2 | * | 1/2023 | Cirette | B65G 47/82 |
| 2013/0062159 | A1 | * | 3/2013 | Fischer | A47F 9/048 198/367 |

* cited by examiner

Primary Examiner — Kavel Singh
(74) Attorney, Agent, or Firm — Stanek Lemon Crouse & Meeks, PA

(57) ABSTRACT

A point-of-sale system is provided including a conveyor that moves an item downstream and/or upstream, a shelf positioned above the conveyor, a defined zone below the shelf and a shield positioned between the conveyor and the shelf. The shield deters the item from moving to the defined zone when the conveyor is moving the item upstream. A method of conveying an item and methods of retrofitting a point-of-sale system are also provided.

17 Claims, 7 Drawing Sheets

CONVEYOR SAFETY SHIELD FOR POINT-OF-SALE SYSTEM

BACKGROUND

Self-checkout systems are commonly used by consumers at retail locations such as grocery stores. In operation, the user can scan items at the self-checkout system and place the scanned items on a scale and conveyor of the self-checkout system. When the item is scanned, the self-checkout system accesses data that indicates information about the scanned item, such as a specified weight. The self-checkout system can then compare the specified weight with the measured weight provided by the scale and conveyor. In this way, the self-checkout system can verify that the scanned items are the ones placed on the conveyor. The scanned items are transported downstream via the conveyor to a bagging station in which the items are placed into bags.

SUMMARY

Some embodiments of the present inventive concept provide a point-of-sale system including a conveyor that moves an item downstream and/or upstream, a shelf positioned above the conveyor, a defined zone below the shelf and a shield positioned between the conveyor and the shelf. The shield deters the item from moving to the defined zone when the conveyor is moving the item upstream.

Further embodiments of the present inventive concept provide a method of conveying items in a point-of-sale system including moving an item upstream on a conveyor towards a designated zone, the designated zone being defined by the conveyor, at least one object positioned above the conveyor and a shield; and deterring the item from entering the designated zone with the shield.

BRIEF DESCRIPTION OF THE SEVERAL VIEWS OF THE DRAWINGS

The present inventive concept will be explained with reference to the following figures in which.

DETAILED DESCRIPTION

Exemplary embodiments of the present disclosure are described in detail with reference to the accompanying drawings. The disclosure may, however, be exemplified in many different forms and should not be construed as being limited to the specific exemplary embodiments set forth herein. Rather, these exemplary embodiments are provided so that this disclosure will be thorough and complete, and will fully convey the scope of the disclosure to those skilled in the art.

Self-checkout lanes are popular among customers and retailers. Customers may approach a self-checkout lane, scan items for purchase, place the items in bags and pay for the items. When the self-checkout lane includes a conveyor, the customers scan the items and place the items on the conveyor. The items are transported downstream by the conveyor to a bagging station. The customer can bag the items before or after completing payment at the customer interface.

A shelf may be located above the conveyor. Part of the customer terminal, for example, a payment console and keypad or printer for printing receipts may be located on top of the shelf. Self-checkout lanes that include a conveyor and an overhanging shelf may pose a safety risk because the area below the shelf has an unintentional consequence of trapping items that may be difficult to retrieve without causing injury to a user's hand or fingers. A small gap between the item and the overhanging shelf may become a pinch hazard. A customer may have a difficult time using their hand to retrieve the item and the user may injure themselves. The pinch hazard may be an issue particularly when the item is round, for example, when the item is a melon.

In accordance with some embodiments of the present inventive concept, a safety shield is connected to the shelf. The safety shield prevents items on the conveyor from moving upstream and being trapped in the area below the shelf. The safety shield allows items under the shelf to move downstream on the conveyor. The safety shield may be connected to the shelf in any manner that allows the shield to move out of the path of an item when the item is conveyed downstream and allows the safety shield to deter the item from being trapped under the shelf when the item is conveyed upstream. Thus, the safety shield is able to reduce the pinch hazards created by items trapped under the shelf.

Figure 1:
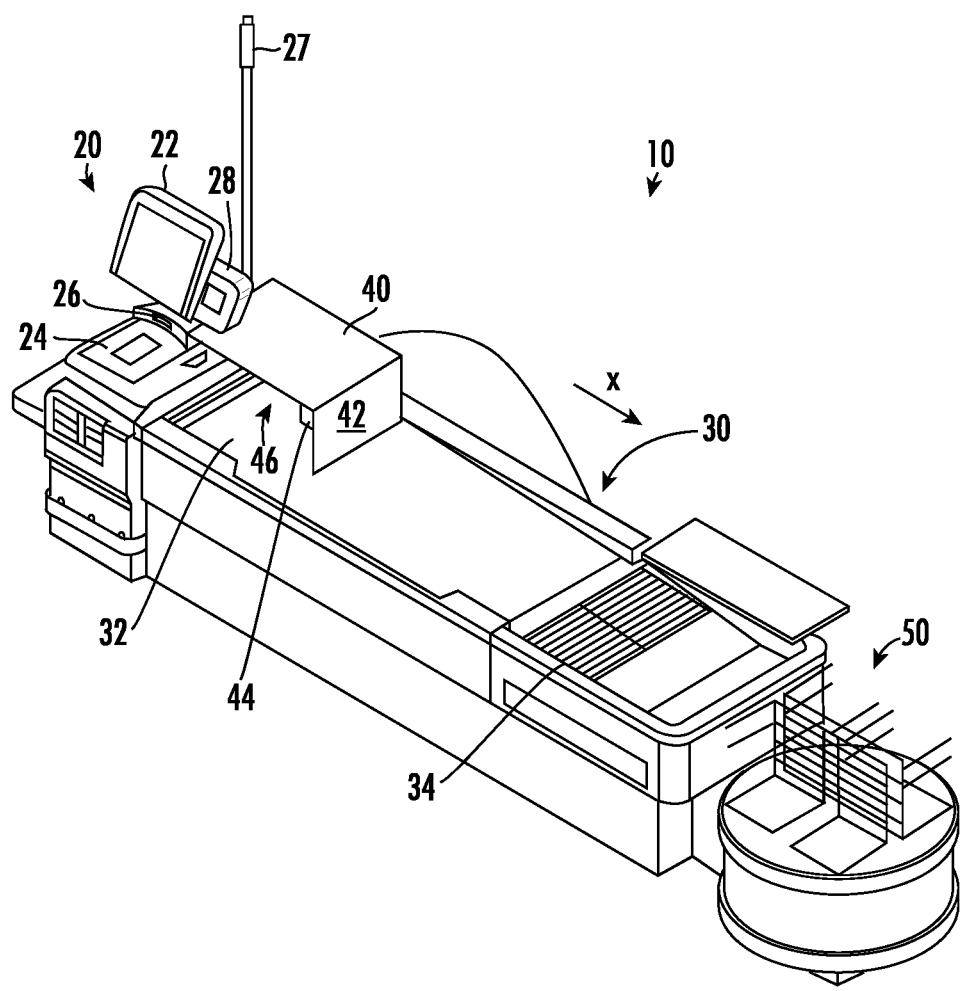
FIG. 1 is a diagram illustrating a self-checkout system in accordance with some embodiments of the present inventive concept.

Referring first to FIG. 1, a point-of-sale system, for example, self-checkout lanes, in accordance with some embodiments of the present inventive concept will be discussed. As illustrated, self-checkout configurations such as a self-checkout lane 10 shown in FIG. 1 may include a terminal 20, a conveying section 30 and a bagging station 50. The terminal 20 may include a customer interface, for example, a touchscreen 22, a scale 24, a scanner 26 and a keypad 28. An indicator 27, for example, a pole with a light attached to the top, may also be included to indicate when a customer needs the assistance of a store employee. A customer may initiate a transaction by pressing a "start" button or entering a loyalty number on the touchscreen 22. The scanner 26 may be used to scan items which are then placed on the conveyor 32. The touchscreen 22 may be used to look up items that need to be weighed, for example, produce such as melons or apples, which are weighed on the scale 24 then placed on the conveyor 32.

It will be understood that the configuration illustrated in FIG. 1 is provided as an example only and that embodiments of the present inventive concept are not limited thereto. The self-checkout lane 10 of FIG. 1 is a right-hand lane configuration in which the conveying section 30 and the bagging station 50 are to the right of the terminal 20. It will be understood that embodiments of the present inventive concept are not limited to this configuration and may also include left-hand lane configurations in which the conveying section and bagging station are to the left of the terminal.

The conveying section 30 includes a conveyor 32 moving items from the terminal 20 towards the bagging station 50 in a downstream direction X. The conveyor 32 may also move items upstream in a direction Y towards terminal 20. As shown in FIGS. 1 to 5, the conveyor 32 is a belt conveyor. The conveying section 30 may also include a second conveyor area including rollers 34 near the bagging station 50. In some embodiments, scales, sideguards and additional scanners may be included in the conveying section 30 to aid in loss prevention. For example, an additional scale may be placed on an upstream end of the conveyor 32, adjacent the terminal 20, to confirm that an item scanned by the scanner 26 and/or weighed by the scale 24 is the same item placed on the conveyor 32 by the user.

Figure 2:
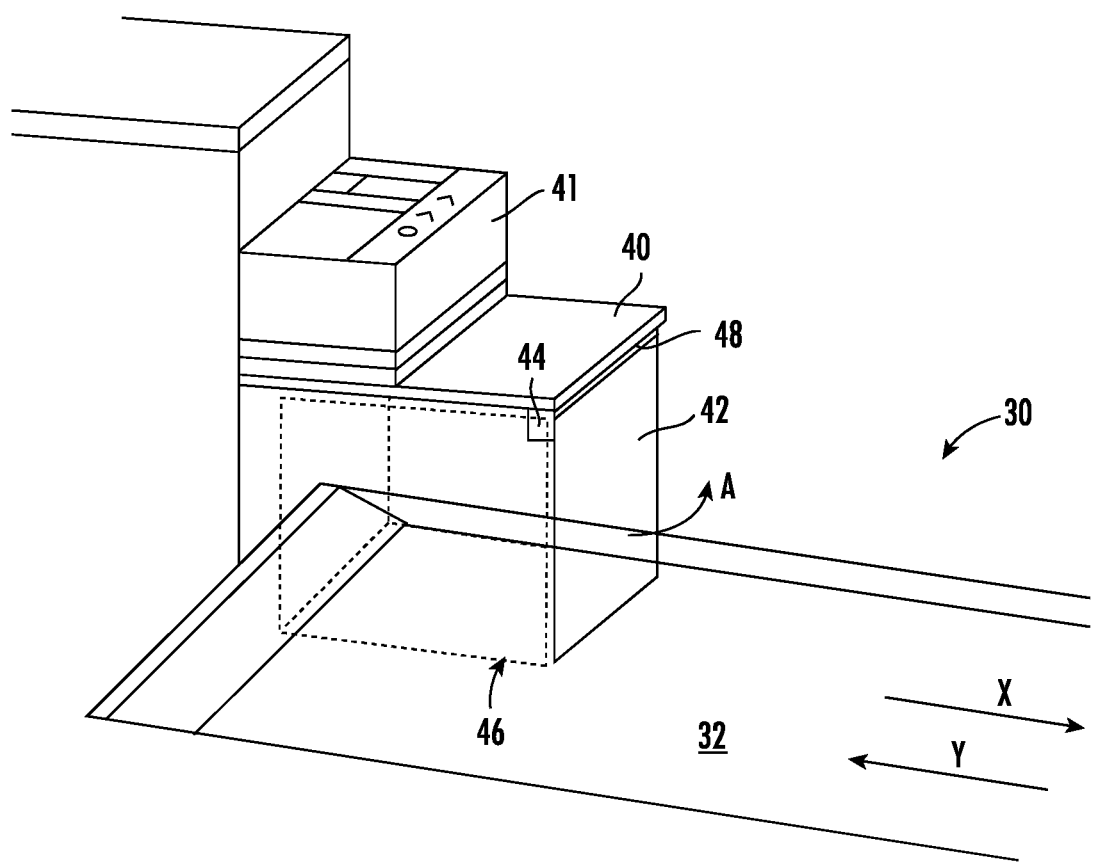
FIG. 2 is a diagram illustrating a safety shield in accordance with some embodiments of the present inventive concept.

As illustrated in FIG. 2, the conveying section 30 includes an overhanging shelf 40. At least a portion of the shelf 40 is positioned above the conveyor 32 defining a zone 46 between the conveyor 32 and the shelf 40. The zone 46 includes a volume, region or area between the conveyor 32 and the shelf 40 shown by dotted lines in FIG. 3. In some embodiments, a printer 41 may be placed upon the shelf 40 for printing receipts when desired. Self-checkout lanes that include a conveyor 32 and overhanging shelf 40 may pose a safety risk because the area below the shelf, zone 46, has an unintentional consequence of trapping items that may be difficult to retrieve without causing injury to a user's hand or fingers. For example, when an item is on the conveyor 32 and the item is moved upstream in direction Y by the user, the item may end up in the zone 46 under the overhanging shelf 40. A small gap between the item and the overhanging shelf 40 in zone 46 may become a pinch hazard. A user may have a difficult time using their hand to retrieve the item from the zone 46 and the user may injure themselves. The pinch hazard may be an issue particularly when the item is round, for example, when the item is a melon.

In accordance with some embodiments of the present inventive concept, a safety shield 42 is connected to the shelf 40 via a hinge 48 as shown in FIGS. 2 to 5. The shield 42 is movable with respect to the shelf 40 and rotatably connected to a downstream end of the shelf 40. The hinge 48 allows the shield 42 to rotate counterclockwise (A) and return back to an initial starting position. The shield 42 may be connected to the shelf 40 or arranged in conveying section 30 in any manner that allows the shield 42 to move out of the path of an item 52 when the item is conveyed downstream and allows the shield 42 to deter the item 52 from entering the zone 46 when the item 52 is conveyed upstream.

In the initial starting position, the shield 42 is substantially perpendicular to the conveyor 32 and the shelf 40. In some embodiments, the shield 42 may not contact an upper surface of the conveyor 32. The shield 42 may be as wide as the shelf 40. The shield 42 may be made from any desirable material, for example, plastic or metal, that sufficiently withstands the force of an item being conveyed upstream, as explained below; the material should be stiff and strong to resist the movement of items 52 in the Y direction.

A stop 44 limits clockwise rotation of the shield 42 so the shield 42 cannot rotate past the initial starting position in the clockwise direction. The stop 44 may be, for example, attached to or part of the shelf 44, the hinge 48 or the shield 42. The stop 44 may be, for example, incorporated into the hinge 48. The stop 44 may be made from any material, including plastic or metal. The stop 44 should be sufficiently strong to resist the rotation of the shield 42 when, for example, heavy low-profile items (i.e. a box of cat litter) are moving upstream in the Y direction. The stop 44 may be fairly small so the stop does not block items placed on the conveyor under the shelf. The stop may be positioned so that the stop is difficult for a customer to reach or touch because the stop could be a pinch hazard. The stop may be hidden by the shelf and shield. The stop may be located in a central area 45 with respect to a width W of shelf 40 and a width w of shield 42 (FIG. 3).

Figure 3:
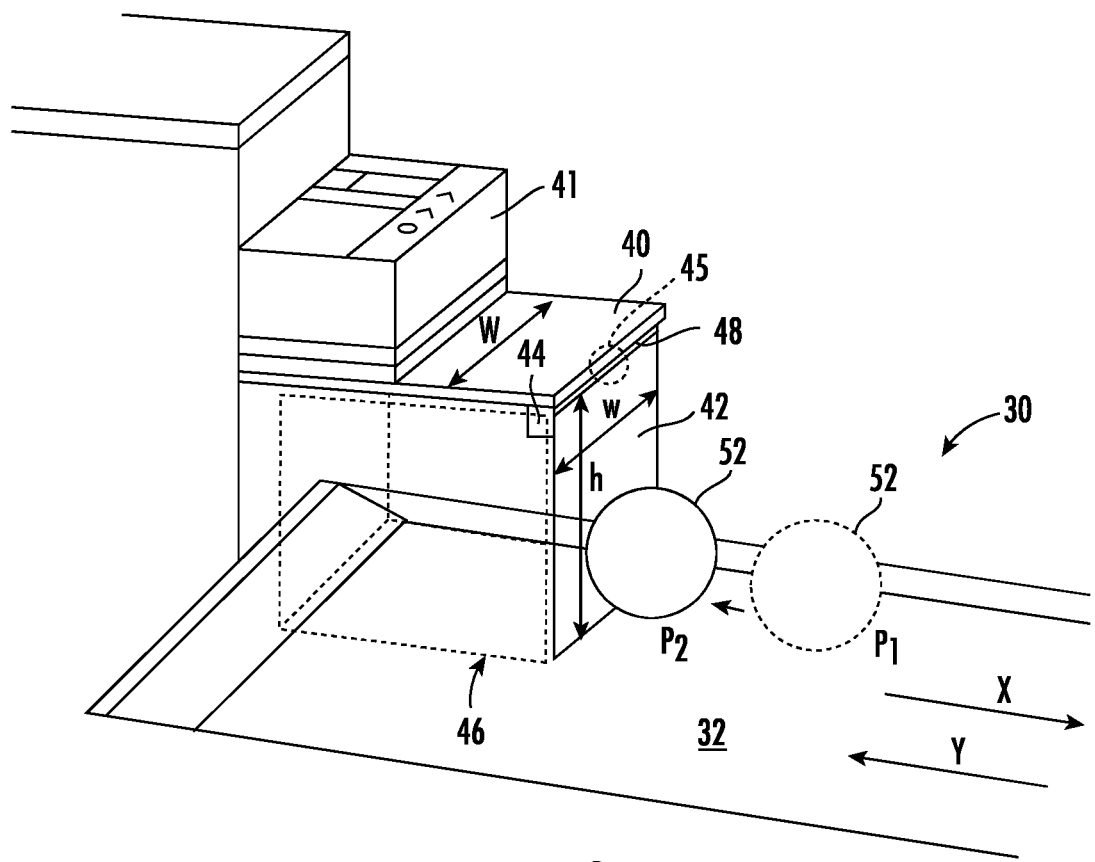
FIG. 3 is a diagram illustrating a safety shield deterring an item from moving upstream in accordance with some embodiments of the present inventive concept.

Referring now to FIG. 3, the item 52 is on the conveyor 32 downstream of the shield 42 at an initial position $P_1$ (to the far right of the shield 42 in the orientation shown). When the conveyor 32 moves upstream in direction Y (to the left in the orientation shown), the item 52 moves together with the conveyor 32 upstream from an initial position $P_1$ until the item 52 reaches the shield 42 or the conveyor 32 stops moving, whichever occurs first. If the item 52 reaches the shield 42 prior to the conveyor 32 stopping, the shield 42 deters the item 52 from entering the zone 46 and the item 52 remains adjacent the shield 42 in a second position $P_2$. If the conveyor 32 continues to move upstream once the item 52 is deterred by the shield 42, the conveyor 32 may move upstream with respect to the item 52 and the item 52 would remain adjacent the shield 42 at position $P_2$. Thus, the shield 42 should be rigid enough to withstand the force of the item 52 as the item 52 is conveyed upstream. The shield 42 may have a width similar to a width W of the shelf 40. Alternatively, the shield 42 may have a width w that is similar to a width of the shelf 40 that overhangs the conveyor 32. As shown in FIG. 3, a width w of the shield 42 is less than a width W of the shelf 40. The shield 42 may have a height h that extends from shelf 40 to just above a surface of the conveyor 32 to reduce friction between the shield 42 and the conveyor 32. The height h of the shield 42 may be varied as desired.

Figure 4:
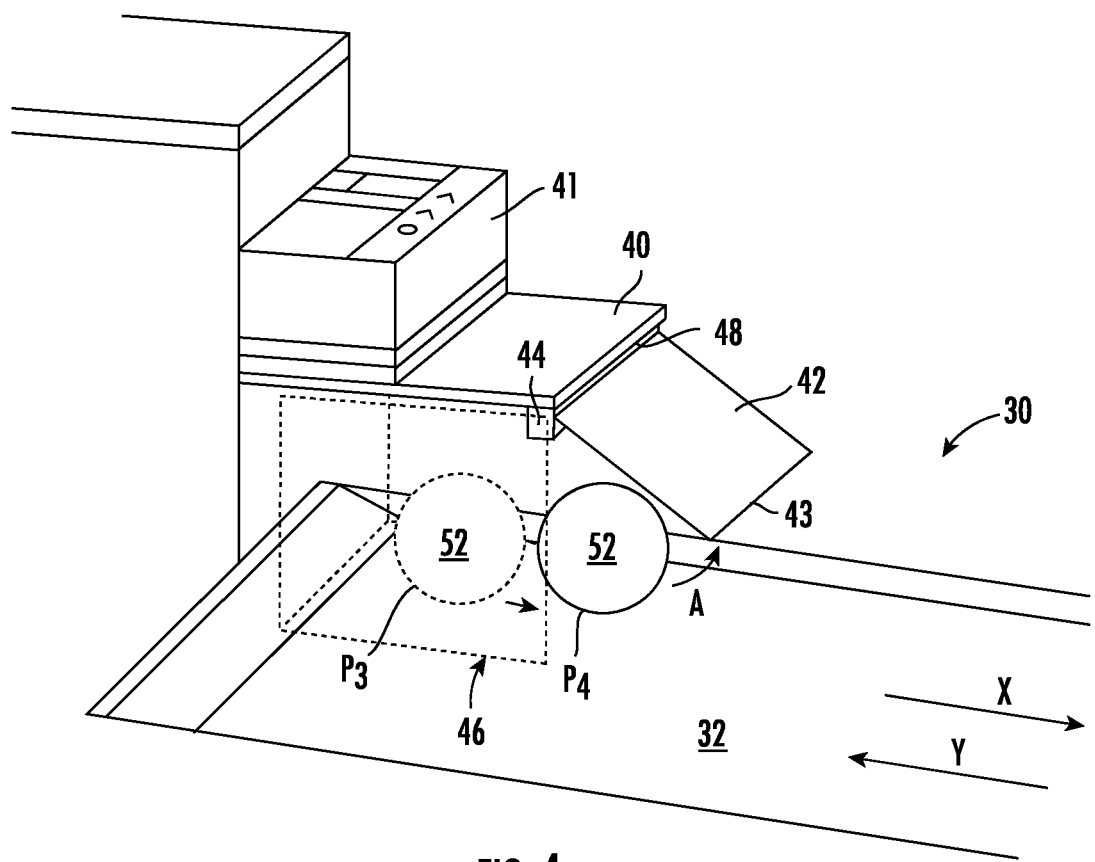
FIGS. 4 and 5 are diagrams illustrating a safety shield in a rotated position in accordance with some embodiments of the present inventive concept.

As illustrated in FIG. 4, when a user places an item 52 on the conveyor 32 in the zone 46 under the overhanging shelf 40, the item 52 can be transported downstream via conveyor belt 32 in direction X to bagging station 50. The shield 42 rotates counterclockwise (A) out of a path of the item 52 as item 52 contacts shield 42 so that the item 52 moves with the conveyor 32 in downstream direction X. As illustrated, the item 52 moves from a third position $P_3$ in the zone 46 downstream to fourth position $P_4$ as the conveyor 32 moves downstream. The item 52 contacts the shield 42, causing the shield 42 to rotate counterclockwise (A) out of a path of the item 52, so that the item 52 can be transported downstream by the conveyor belt 32. In this embodiment, a free end 43 of the safety shield 42, opposite the hinge 48, lifts away from the conveyor 32 as a contact force is applied to the safety shield 42 by the item 52. As the free end 43 lifts away from the conveyor 32, the shield 42 is skewed with respect to conveyor 32. The item 52 forces the free end 43 up such that the item 52 can be conveyed downstream by conveyor 32.

Figure 5:
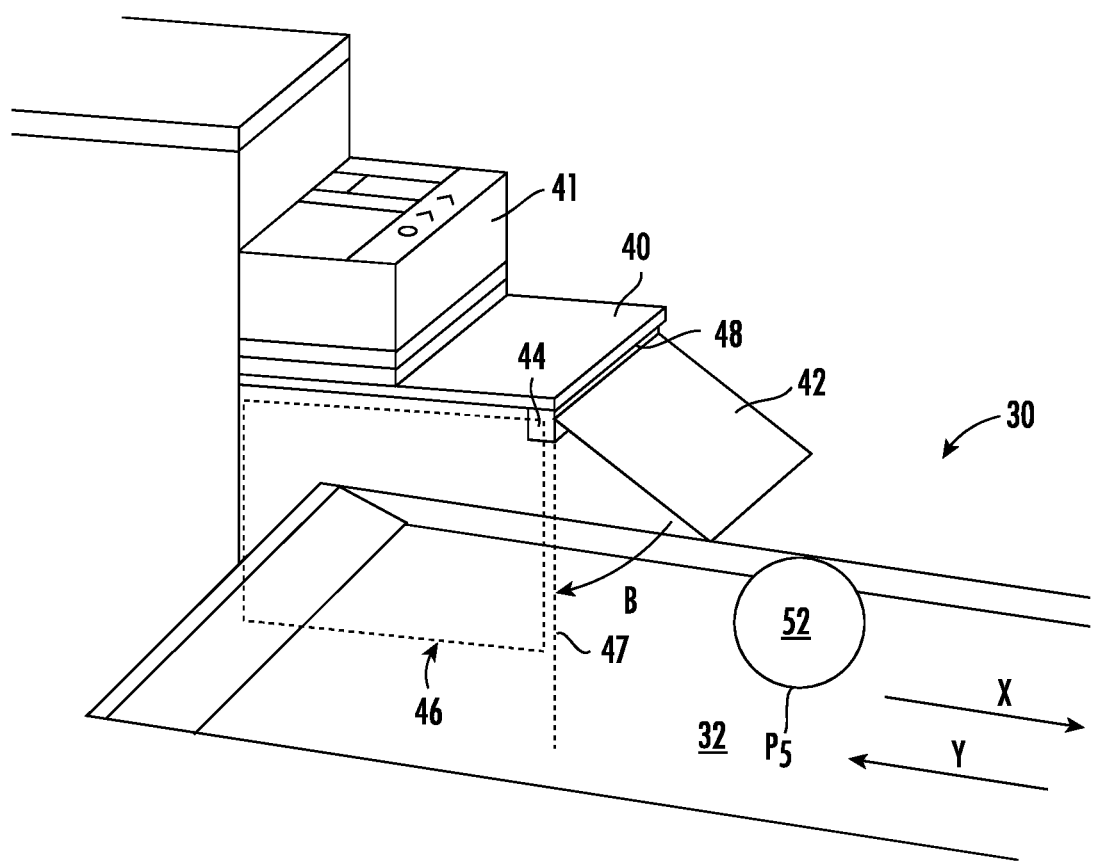

Referring to FIG. 5, the item 52 is transported downstream past the shield 42 to a fifth position $P_5$. Once the item 52 no longer contacts the shield 42, the shield 42 returns to an initial starting position 47 by rotating clockwise (B). The shield 42 may return to the initial starting position 47 via gravity, a spring-loaded feature, or a return, for example.

Figure 6:
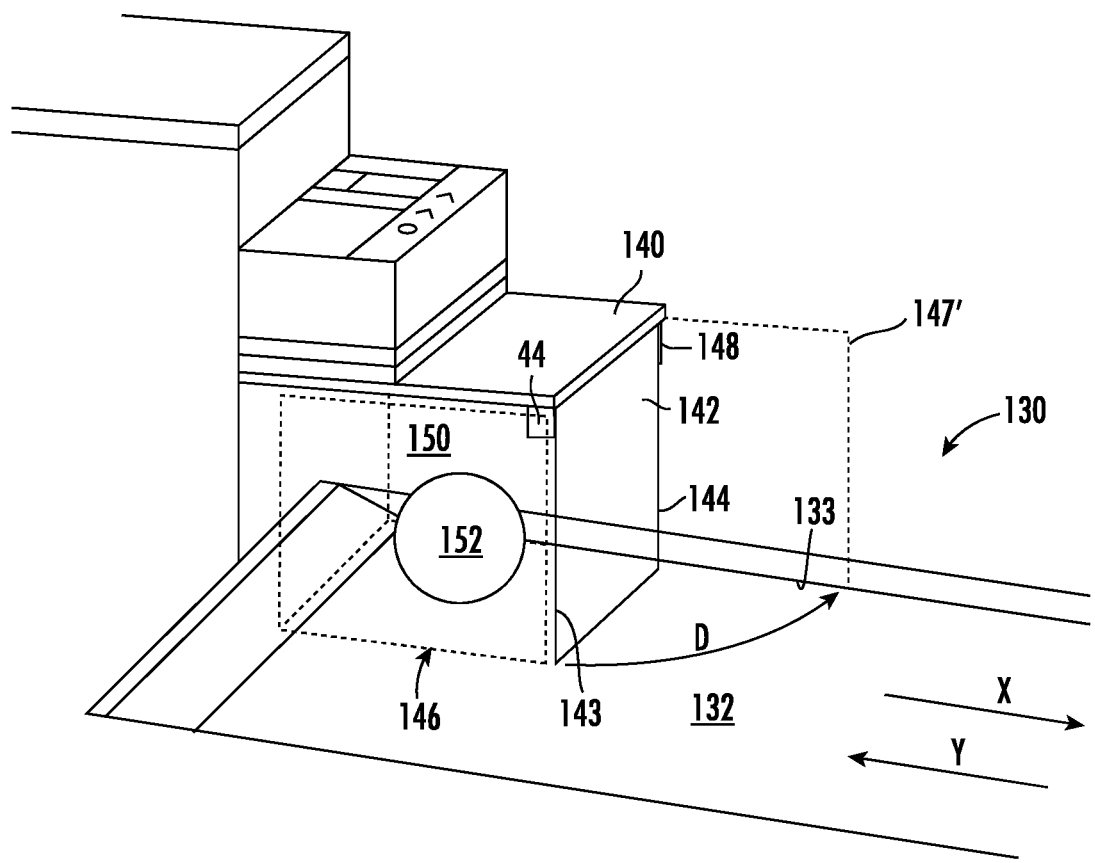
FIG. 6 is a diagram illustrating a safety shield in accordance with some embodiments of the present inventive concept.

Referring now to FIG. 6, in one example embodiment, a back edge 144 of the safety shield 142 is connected via a hinge 148 to a backstop or support 150 for shelf 140 in conveying section 130. In the initial starting position, the safety shield 142 is approximately perpendicular to the conveyor 132. The safety shield 142 swings open in downstream direction X upon contact by an item 152 in the zone 146. A free end 143 of shield 142, opposite the back end 144, moves towards an outer edge 133 of conveyor 132. As illustrated in FIG. 6, shield 142 rotates counterclockwise via hinge 148 to an open position designated by dashed lines 147'. In contrast to the embodiments shown in FIGS. 4 and 5, the free end 143 of shield 142 remains approximately perpendicular to conveyor 132 in both the initial starting position and in the open position represented 147'. After the item 152 passes out of the zone 146, the safety shield 142 returns to the initial starting position via a return, for example, a soft close.

Figure 7:
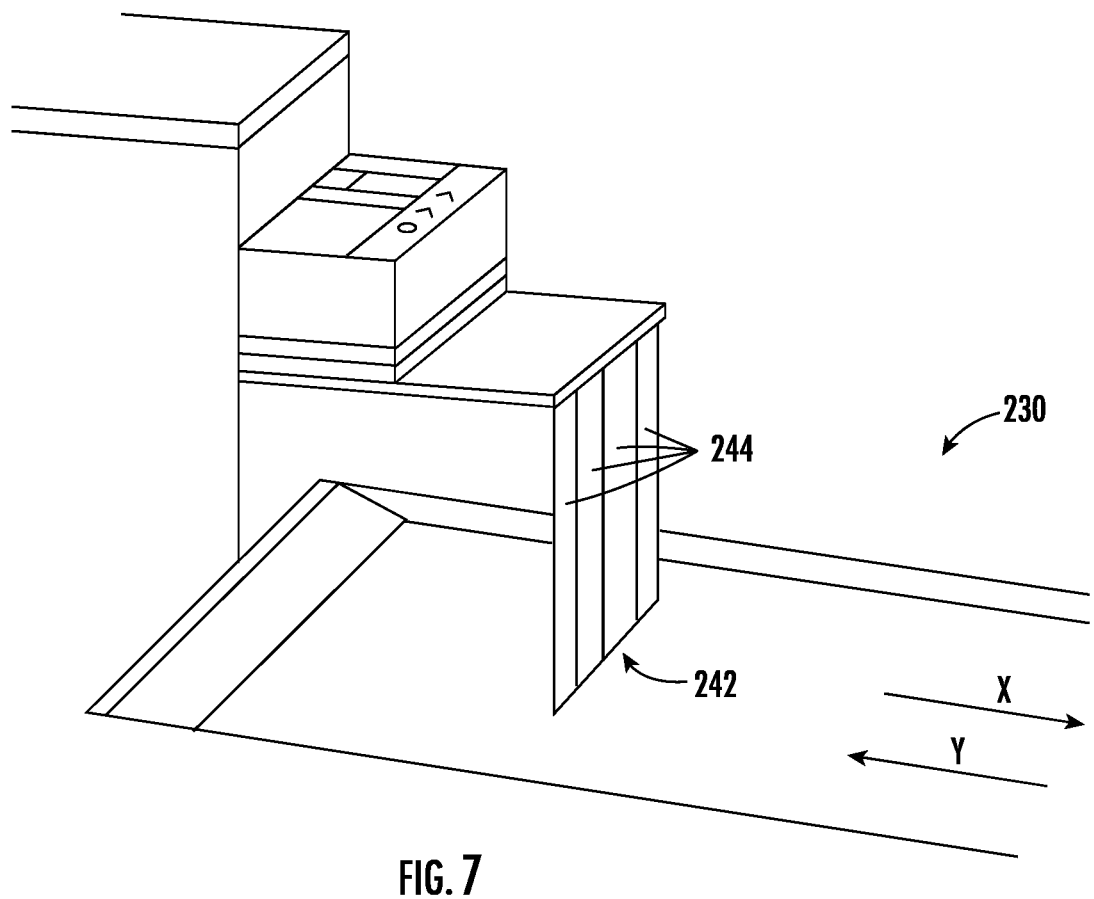
FIG. 7 is a diagram illustrating a safety shield in accordance with some embodiments of the present inventive concept.

In one example, illustrated in FIG. 7, the shield 242 includes more than one component. The shield 242 includes a plurality of panels 244 which may move together or independently with respect to one another.

In the present disclosure, reference is made to a "Point-Of-Sale (POS) system." As used herein, the term "POS system" refers to any system that is used to process transactions at a retail store or other business, including self-checkout (SCO) systems where individuals can scan, pay for, or bag their own items. POS systems are used for a variety of purposes, such as completing sales transactions, processing returns, or handling inquiries. POS systems can be found in a variety of settings, including traditional brick-and-mortar retail stores, online stores, and mobile sales environments.

The terminology used herein is for the purpose of describing particular embodiments only and is not intended to be limiting to other embodiments. As used herein, the singular forms "a", "an" and "the" are intended to include the plural forms as well, unless the context clearly indicates otherwise. It will be further understood that the terms "comprises," "comprising," "includes" and/or "including", "have" and/or "having" when used herein, specify the presence of stated features, integers, steps, operations, elements, and/or components, but do not preclude the presence or addition of one or more other features, integers, steps, operations, elements, components, and/or groups thereof. Elements described as being "to" perform functions, acts and/or operations may be configured to or other structured to do so. As used herein the term "and/or" includes any and all combinations of one or more of the associated listed items and may be abbreviated as "/".

Unless otherwise defined, all terms (including technical and scientific terms) used herein have the same meaning as commonly understood by one of ordinary skill in the art to which various embodiments described herein belong. It will be further understood that terms used herein should be interpreted as having a meaning that is consistent with their meaning in the context of this specification and the relevant art and will not be interpreted in an idealized or overly formal sense unless expressly so defined herein.

While the foregoing is directed to aspects of the present disclosure, other and further embodiments of the disclosure may be devised without departing from the basic scope thereof, and the scope thereof is determined by the claims that follow.

What is claimed is:

1. A point-of-sale system comprising:
   a conveyor that moves an item downstream and/or upstream;
   a shelf positioned above the conveyor such that the shelf extends over a top surface of the conveyor;
   a defined zone below the shelf between the top surface of the conveyor and a bottom surface of the shelf; and
   a shield hinged on an edge of the shelf and extending down to the top surface of the conveyor, wherein the shield deters the item from moving to the defined zone when the conveyor is moving the item upstream.

2. The point-of-sale system of claim 1, wherein the shield is connected to the shelf.

3. The point-of-sale system of claim 2, wherein the shield is connected on or near a downstream end of the shelf.

4. The point-of-sale system of claim 2, wherein the shield is rotatably connected to the shelf.

5. The point-of-sale system of claim 4, wherein, when the item is in the defined zone, the shield rotates out of a path of the item so the item moves with the conveyor downstream.

6. The point-of-sale system of claim 4, wherein, when the item is in the defined zone, and the conveyor moves the item downstream, the item contacts an upstream side of the shield causing the shield to rotate out of a path of the item so the item moves with the conveyor downstream past the shield.

7. The point-of-sale system of claim 5, wherein the shield returns back to an initial position after the item moves downstream of the shield.

8. The point-of-sale system of claim 4, further comprising a stop, the stop limiting rotation of the shield.

9. The point-of-sale system of claim 8, wherein the stop limits rotation of the shield in one direction.

10. The point-of-sale system of claim 1, further comprising a stop, the stop limiting movement of the shield.

11. The point-of-sale system of claim 1, wherein, when the item is in the defined zone, the shield moves so the item can move with the conveyor downstream.

12. The point-of-sale system of claim 1, wherein the conveyor is a belt conveyor.

13. The point-of-sale system of claim 1, wherein the shield is substantially perpendicular to the conveyor in an initial position.

14. The point-of-sale system of claim 1, wherein the shield does not contact a surface of the conveyor.

15. The point-of-sale system of claim 1, wherein the shield includes a plurality of components.

16. The point-of-sale system of claim 15, wherein the components are panels.

17. The point-of-sale system of claim 1 further comprising a support, the shield being connected to the support.

* * * * *